United States Patent
Loughran et al.

(10) Patent No.: US 6,895,576 B2
(45) Date of Patent: May 17, 2005

(54) METHOD AND SYSTEM FOR DEVICE DRIVER AND OPERATING SYSTEM DEBUGGING OF PORTABLE COMPUTERS

(75) Inventors: Stephen A Loughran, Corvallis, OR (US); Weng Wah Loh, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 604 days.

(21) Appl. No.: 09/982,687

(22) Filed: Oct. 18, 2001

(65) Prior Publication Data

US 2003/0079204 A1 Apr. 24, 2003

(51) Int. Cl.[7] .............................................. G06F 9/44
(52) U.S. Cl. ..................................................... 717/124
(58) Field of Search ............................ 717/124–135; 710/100, 107, 110, 305–306

(56) References Cited

U.S. PATENT DOCUMENTS 5,463,764 A * 10/1995 Mueller ...................... 717/124
5,592,609 A * 1/1997 Suzuki et al. ............... 345/473
6,067,589 A    5/2000 Mamata ......................  710/63
6,173,419 B1 * 1/2001 Barnett ......................... 714/28
6,725,449 B1 * 4/2004 Maeda et al. ............... 717/124

OTHER PUBLICATIONS

Gielen et al. The Design of D.A.R.T.S.: A Dynamic Debugger for Multiprocessor Real–time Applications. IEEE. 1991.*

Dervisoglu. Application of Scan Hardware and Software for Debug and Diagnostics in a Workstation Environment. IEEE. 1990.*

* cited by examiner

Primary Examiner—Wei Y. Zhen
(74) Attorney, Agent, or Firm—Jeff D Limon

(57) ABSTRACT

A method and system for transmitting and receiving a debugging information word in a computing device is disclosed. The method includes setting a main processor to run in a debugging mode. The method continues with the main processor transmitting the debugging information word to a keyboard controller. The method further includes transmitting, by the keyboard controller, the debugging information word using a secondary bus coupled to the keyboard controller.

27 Claims, 3 Drawing Sheets

METHOD AND SYSTEM FOR DEVICE DRIVER AND OPERATING SYSTEM DEBUGGING OF PORTABLE COMPUTERS

BACKGROUND OF THE INVENTION

The invention relates generally to the field of computers and, more particularly, to the development of software that runs on portable computers.

In many portable and laptop computers available today, connector ports for peripherals and other devices are available on the rear, side, or bottom surfaces of the computer. In addition to enabling the quick connection and disconnection of peripherals that operate in conjunction with the portable or laptop computer, these connector ports can also be used to debug the drivers and the operating system that enable the computer to communicate with the peripherals. The capability to perform the debugging of drivers has been due, at least in part, to the use of particular types of connectors that are intended for use with particular types of devices. These are sometimes referred to as "legacy" connectors.

However, as portable and laptop computers move away from the use of legacy connectors in favor of legacy-free connections, such as universal serial bus (USB), the ability to perform device driver debugging operations using the legacy connector is reduced. This is primarily due to the increased complexity of the legacy-free drivers. Further, in the event that a developer is attempting to debug a portion of the computer's operating system, it is likely that the computer's USB communication capability is degraded. Consequently, without a fully functioning operating system, it may be necessary for the developer to break into the computer's case in order to access an internal bus structure so that debugging operations can be performed.

Therefore, it is highly desirable for a method for device driver and operating system debugging that does not require the developer to invade the computer's case in order to access the computer's internal bus structure.

DESCRIPTION OF THE PREFERRED EMBODIMENTS

Figure 1:
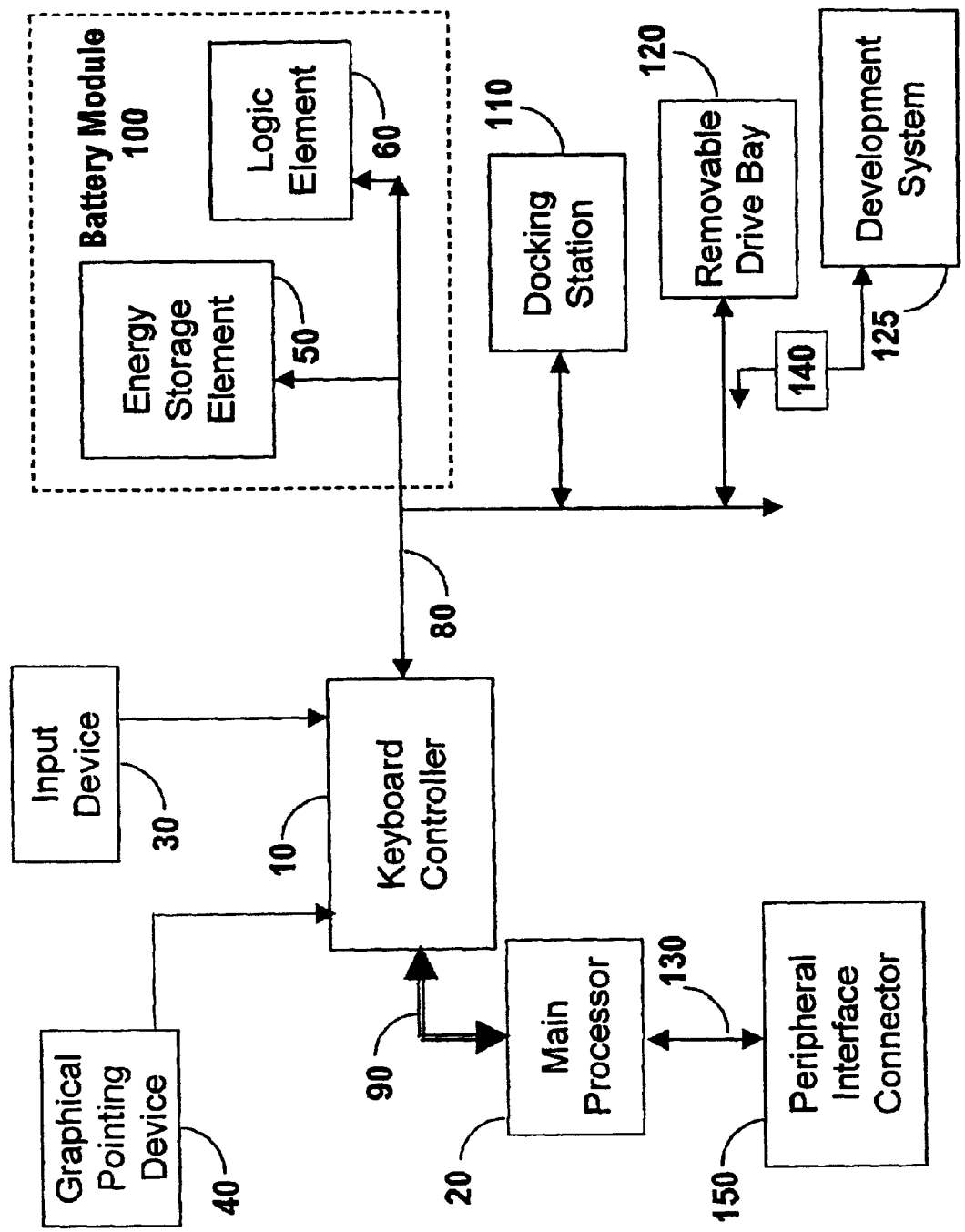
FIG. 1 is a block diagram of portions of a computer that enables device driver debugging in accordance with a preferred embodiment of the invention.

FIG. 1 is a block diagram of portions of a computer that enables device driver debugging in accordance with a preferred embodiment of the invention. In FIG. 1, keyboard controller 10 communicates with main processor 20 by way of main processor bus 90. Main processor bus 90 preferably interfaces with other elements of the computer of FIG. 1, such as memory devices and other equipment, which are not shown in the figure. Keyboard controller 10 also includes an interface to input device 30, which can be a keyboard, keypad, or other input device. Graphical pointing device 40 also communicates with keyboard controller 10. Graphical pointing device 40 can be a mouse, trackpad, touchpad, or any other device used to control the placement of a symbol or an icon on a display coupled to the computing environment of FIG. 1. Preferably, keyboard controller 10 samples the various selectors present on input device 30 and graphical pointing device 40 so that when a user interacts with either device 30 or 40, signals generated by the selectors can be conveyed from the input device through the keyboard controller 10 and on to the main processor 20.

Keyboard controller 10 further communicates with battery module 100 by way of secondary bus 80. Preferably, keyboard controller 10 monitors the charging and discharging of energy storage element 50 by way of logic element 60. The use of logic element 60 provides the keyboard controller with information that allows the safely and efficiently charge and discharge of energy storage element 50. Thus, logic element 60 can report the temperature of energy storage element 50, the rate of charge or discharge, or any other information pertaining to energy storage element 50. In the embodiment of FIG. 1, this communication takes place using secondary bus 80, which is an inter-integrated circuit bus (I2C). However, other types of communications protocols may be used to operate secondary bus 80.

Also interfaced to secondary bus 80, is docking station 110 and removable drive bay 120. Preferably, docking station 110 includes a computer docking or hosting device that provides charging to battery module 100, and may also provide increased display capability. Removable drive bay 120 represents a disk or other type of memory device that uses any suitable memory storage technology such as optical or magnetic storage. Desirably, removable drive bay 120 can be removed so that development system 125 can access secondary bus 80.

Development system 125 includes an interface that enables access to secondary bus 80 by way of a connection to an interface to removable drive bay 120. Thus, to gain access to secondary bus 80, removable drive bay 120 is removed, and development system 125 is interfaced with secondary bus 80 in place of the removable drive bay. Desirably, development system 125 represents a substantially capable computer system that may include special purpose hardware and software modules that enable a developer to transmit and receive debugging information words along secondary bus 80.

Serial port adapter 140 represents a conventional adapter that converts serial commands to and from development system 125. This allows debugging information words to be passed from the development system to and from secondary bus 80. In a preferred embodiment, serial port adapter 140 converts serial commands to and from the development system into messages suitable for use on an I2C bus. An example of a candidate serial port to I2C adapter is readily available from Calibre UK Limited, at Cornwall House, Cornwall Terrace, Bradford, West Yorkshire, BD8 7JS, United Kingdom.

In the embodiment of FIG. 1, development system 125 is used to perform test and debugging operations on main processor 20. During the debugging operations, in which device drivers and the operating system itself can be debugged, the operating system that runs on the main processor is placed in a kernel or other mode in which only the central module of the operating system is allowed to run on main processor 20. While operating in this mode, communications to and from main processor 20 along universal serial bus 130 may be substantially hindered, thereby deactivating any signals present at peripheral interface connector 150.

While operating in the kernel mode, debugging information words that are intended for transmission using USB 130 are routed instead along main processor bus 90 to keyboard controller 10. This rerouting of signals is performed under the control of a debugging program that runs on main processor 20. After receiving the debugging words, keyboard controller 10 formats these words and transmits the resulting debugging information words along secondary bus 80 so that these words can be converted to a serial stream by way of serial port adapter 140. After this conversion, the converted debugging information words are read and interpreted by development system 125.

Debugging information words transmitted from development system 125 are converted from a serial stream by way of serial port adapter 140 and along secondary bus 80. These words are received by keyboard controller 10 and transmitted along main processor bus 90 to main processor 20. Preferably, keyboard controller 10 also posts an event that informs main processor 20 that a debugging information word has been received. Under the control of the operating system running in the kernel mode, main processor 20 acts upon the received debugging information word as though the word had been received by way of USB 130.

Although serial port adapter 140 of FIG. 1 is shown as being interfaced to secondary bus 80 near removable drive bay 120, the serial port adapter can instead be located at other positions along secondary bus 80. Thus, for example, battery module 100 can be removed to allow serial port adapter 140 to be interfaced to the secondary bus in place of the removed module. Serial port adapter 140 can also be located in place of docking station 110, if desired.

In an alternative embodiment, the debugging information words are intended for a port other than USB 130, such as a port hidden on the motherboard of the computer of FIG. 1 or another driver. Thus, a kernel debugger running on main processor 20 can include any low-level transport layer, such as an I2C layer as shown in FIG. 1 or a variety of other transport layers. Consequently, in lieu of rerouting debugging information words intended for transmission along USB 130 (as in FIG. 1), the debugging information words can be delivered to the keyboard controller by way of an extension library to existing kernel debuggers, or written straight into a new kernel debugger.

Figure 2:
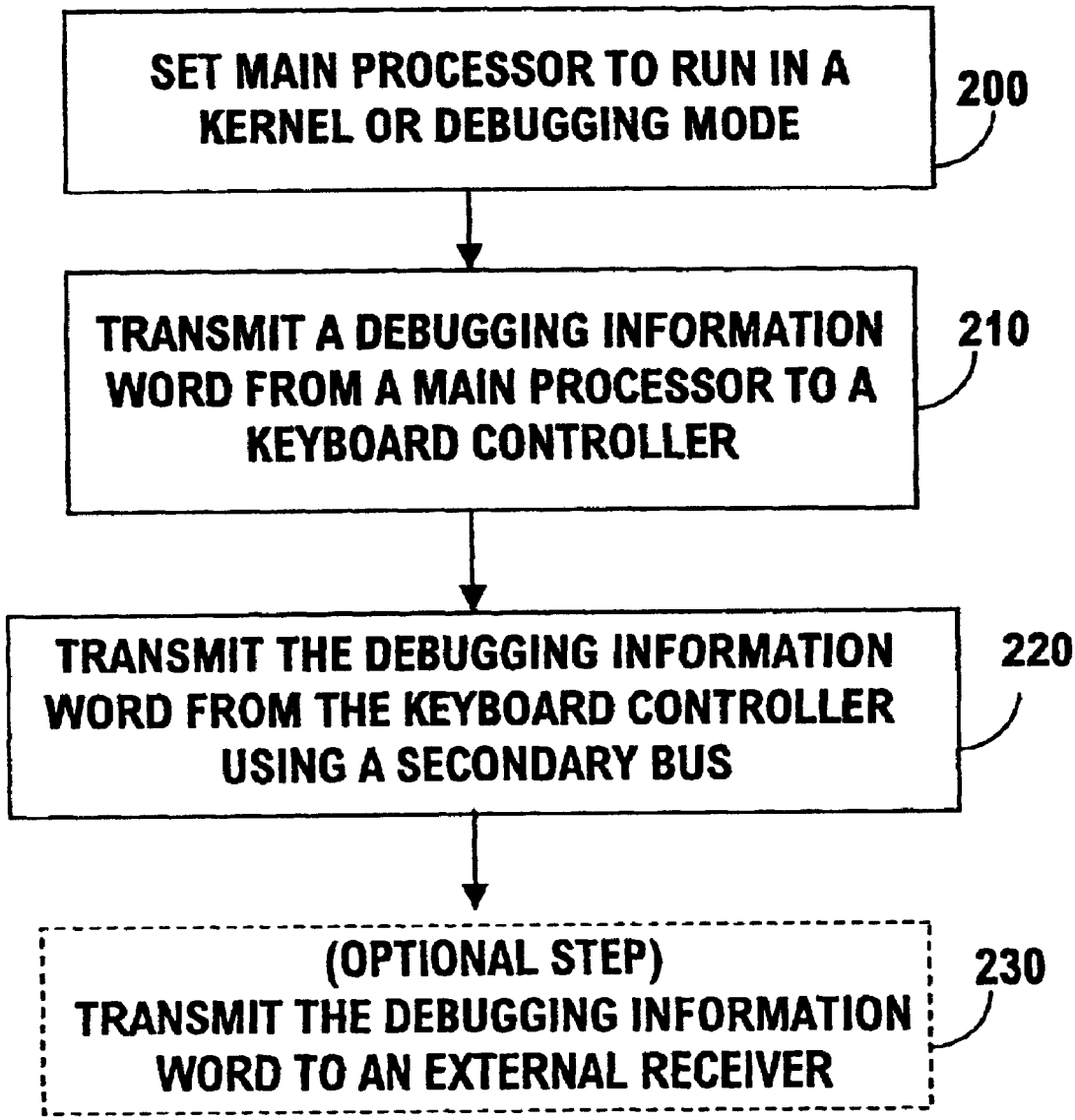
FIG. 2 is a first method for device driver debugging of portable computers in accordance with a preferred embodiment of the invention.

FIG. 2 is a flowchart of a method for transmitting a debugging information word from a computing device in accordance with a preferred embodiment of the invention. The method of FIG. 2 begins at block 200 in which a main processor is set to run in a debugging mode. Desirably, the transmission and reception of debugging information words is limited to certain operational modes, such as during an operating system or device driver debugging mode. The method continues at block 210, at which a debugging information word is transmitted to a keyboard controller from a main processor.

The method continues at block 220, at which the debugging information word is transmitted using a secondary bus. In block 220, the secondary bus can be an I2C bus that communicates with a battery or other energy storage device that provides electrical power to the main processor. The method can continue at block 230, with the transmission of the debugging information word to an external receiver. This can be accomplished by way of a serial port adapter that converts I2C messages to a serial stream.

Figure 3:
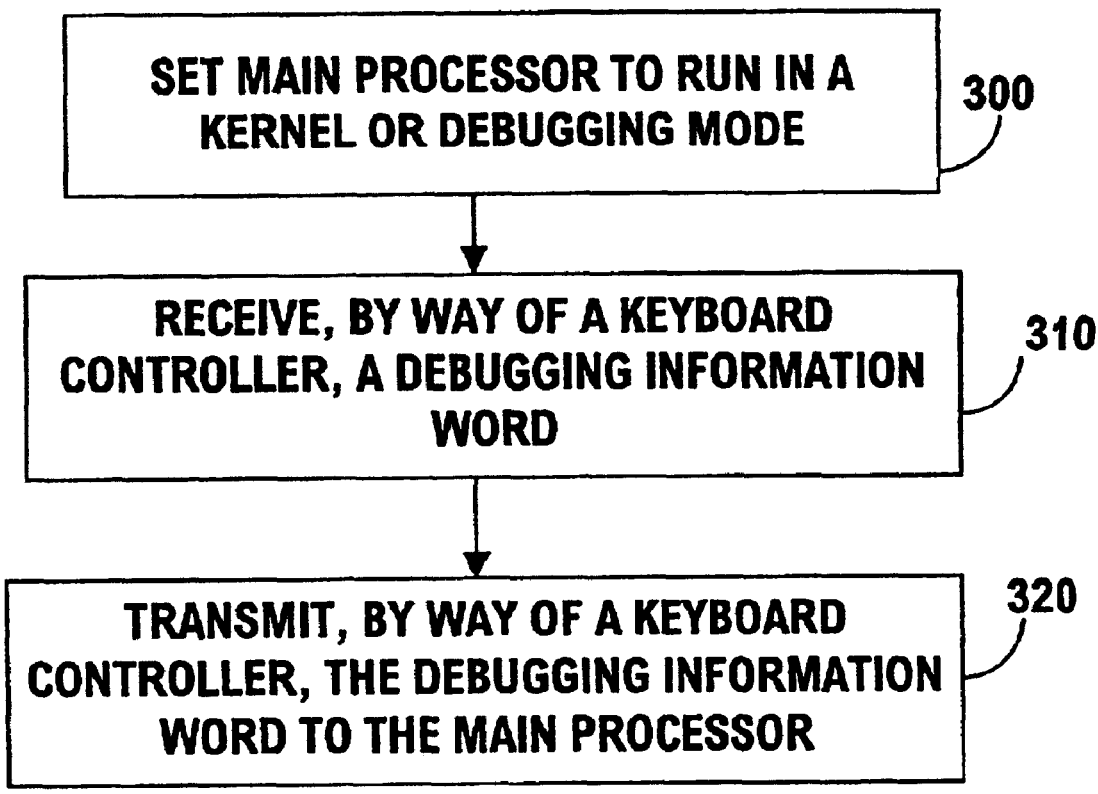
FIG. 3 is a flowchart for a method for receiving a debugging information word by a main processor in accordance with a preferred embodiment of the invention.

FIG. 3 is a flowchart for a method for receiving a debugging information word by a main processor in accordance with a preferred embodiment of the invention. The method of FIG. 3 may be encoded on one or more computer readable media having computer readable instructions thereon which, when executed by a computer, cause the computer to perform the method. The method of FIG. 3 begins at block 300 in which a main processor is set to run in a debugging or a kernel mode.

The method continues at block 310 in which a keyboard controller, coupled to the main processor, receives a debugging information word from a secondary bus. Preferably, the secondary bus is an I2C bus but can be any other type of communications bus. The method continues at block 320, which includes a keyboard controller transmitting the debugging information word to the main processor, preferably by way of a main processor bus.

In a preferred embodiment, the main processor of FIG. 3 receives and transmits the debugging information words only under certain circumstances, such as when the main processor is operated in a debugging mode or in a kernel mode. The method of FIG. 3 can also include receiving the debugging information word from an adapter that transmits the information word along the secondary bus, wherein the adapter interfaces with an external source.

What is claimed is:

1. A method for transmitting a debugging information word from a computing device, comprising:
    setting a main processor to run in a debugging mode;
    said main processor transmitting said debugging information word to a keyboard controller through a main processor bus; and
    transmitting, by said keyboard controller, said debugging information word using a secondary bus coupled to said keyboard controller, wherein the keyboard controller also includes an interface to an input device.

2. The method of claim 1, wherein said secondary bus is an inter-integrated circuit bus.

3. The method of claim 1, wherein said secondary bus also communicates with a battery that provides electrical power to said main processor.

4. The method of claim 1, wherein said main processor transmits debugging information words to said keyboard controller only when said main processor operates in said debugging mode.

5. The method of claim 1, additionally comprising receiving, by a converter interfaced to said secondary bus, said debugging information word transmitted from said keyboard controller.

6. The method of claim 5, additionally comprising said converter transmitting said debugging information word to an external receiver.

7. The method of claim 1, wherein said debugging mode is a kernel mode of an operating system.

8. A computer that is debugged by way of a connection to a secondary bus, comprising:
    a main processor that executes an operating system program in a kernel mode;
    a keyboard controller that interfaces to an input device and to said main processor, said keyboard controller communicating debugging information words with said main processor through a main processor bus; and
    a secondary bus that interfaces with said keyboard controller, said secondary bus being used to convey said debugging information words.

9. The computer of claim 8, wherein said secondary bus does not interface directly with said main processor.

10. The computer of claim 8, wherein said secondary bus interfaces with an adapter that receives said information words from a computing device external to said computer.

11. The computer of claim 8, wherein said main processor receives debugging information words from said keyboard controller only when said main processor operates in said kernel mode.

12. The computer of claim 8, wherein said main processor transmits debugging information words from said keyboard controller only when said main processor operates in said kernel mode.

13. The computer of claim 8, wherein said secondary bus interfaces to a module that supplies electrical power to said main processor.

14. The computer of claim 8, wherein said secondary bus is an inter-integrated circuit bus.

15. A method for receiving a debugging information word by a main processor, comprising:

setting said main processor to run in a debugging mode;

receiving, by a keyboard controller coupled to said main processor and to an input device, said debugging information word from a secondary bus; and said keyboard controller transmitting, through a main processor bus, said debugging information word to said main processor.

16. The method of claim 15, wherein said keyboard controller and said main processor communicate by way of a main processor bus.

17. The method of claim 15, wherein said secondary bus is an inter-integrated circuit bus.

18. The method of claim 15, wherein said main processor receives debugging information word from said keyboard controller only when said main processor operates in said debugging mode.

19. The method of claim 15, additionally comprising receiving said debugging information word from an adapter that transmits said debugging information word along said secondary bus wherein said adapter interfaces with an external source.

20. One or more computer-readable media having computer-readable instructions thereon which, when executed by a computer, cause the computer to perform a method for receiving a debugging information word by a main processor comprising the steps of:

setting an operating system that runs on said main processor of said computer to run in a kernel mode;

receiving, by a keyboard controller coupled to said main processor and to an input device, a debugging information word from a secondary bus; and transmitting, by said keyboard controller, said debugging information word to said main processor through a main processor bus.

21. The method of claim 20, wherein said secondary bus is an inter-integrated circuit bus.

22. The method of claim 20, wherein said main processor receives debugging information words from said keyboard controller when said main processor operates in said debugging mode.

23. The method of claim 20, additionally comprising receiving said debugging information word from an adapter that transmits said debugging information word along said secondary bus wherein said adapter interfaces with an external source.

24. A system for debugging a first computer by way of a second computer, the system comprising:

a main processor that operates in said first computer, said main processor executing an operating system program that runs in a kernel mode;

a keyboard controller that interfaces with said main processor and interfaces with an input device, said keyboard controller communicating debugging information words with said main processor through a main processor bus;

a secondary bus that interfaces with said keyboard controller, said secondary bus being used to convey said debugging information words; and an adapter that conveys said debugging information to said second computer, wherein said second computer is interfaced to said first computer by way of said secondary bus.

25. The system of claim 24, wherein said secondary bus additionally communicates with a battery module of said first computer.

26. The system of claim 24, wherein said input device is a graphical pointing device.

27. The system of claim 24, wherein said secondary bus additionally communicates with at least one indicator that presents information as to the status of said first computer.

* * * * *